US012733083B2

(12) United States Patent
Baright et al.

(10) Patent No.: US 12,733,083 B2
(45) Date of Patent: Sep. 8, 2026

(54) METHOD AND SYSTEM FOR CHANGING A FUNCTION OF A LIGHTING DEVICE

(71) Applicant: G&G LED, LLC, Clifton Park, NY (US)

(72) Inventors: Jason Baright, Clifton Park, NY (US); Caleb Peterson, Clifton Park, NY (US)

(73) Assignee: G&G LED, LLC, Malta, NY (US)

( * ) Notice: Subject to any disclaimer, the term of this patent is extended or adjusted under 35 U.S.C. 154(b) by 311 days.

(21) Appl. No.: 18/192,242

(22) Filed: Mar. 29, 2023

(65) Prior Publication Data

US 2023/0239989 A1 Jul. 27, 2023

Related U.S. Application Data

(63) Continuation-in-part of application No. 18/047,508, filed on Oct. 18, 2022, now abandoned, which is a continuation-in-part of application No. 17/450,337, filed on Oct. 8, 2021, now abandoned.

(60) Provisional application No. 63/091,042, filed on Oct. 13, 2020.

(51) Int. Cl.
*H05B 47/175* (2020.01)
*H04L 9/40* (2022.01)
*H05B 47/19* (2020.01)

(52) U.S. Cl.
CPC ......... *H05B 47/1965* (2024.01); *H05B 47/19* (2020.01); *H04L 63/08* (2013.01)

(58) Field of Classification Search
CPC .................. H05B 47/11; H05B 47/175; H05B 47/19–1975; Y02B 20/40; G05D 25/02
See application file for complete search history.

(56) References Cited

U.S. PATENT DOCUMENTS

| | | | | |
|---|---|---|---|---|
| 9,544,967 | B2 | 1/2017 | Recker et al. | |
| 10,143,053 | B1 | 11/2018 | Wilson et al. | |
| 11,349,901 | B1 | 5/2022 | Duffield et al. | |
| 2009/0243517 | A1 | 10/2009 | Verfuerth et al. | |
| 2013/0096702 | A1* | 4/2013 | Sorokin | G05B 19/042 700/83 |
| 2013/0162151 | A1 | 6/2013 | Van De Ven et al. | |
| 2014/0286517 | A1 | 9/2014 | Luna et al. | |
| 2015/0022093 | A1 | 1/2015 | Smith et al. | |
| 2015/0035440 | A1 | 2/2015 | Spero | |

(Continued)

FOREIGN PATENT DOCUMENTS

| | | | | |
|---|---|---|---|---|
| CN | 108594741 A | * | 9/2018 | H05B 47/105 |
| KR | 20150056716 A | * | 5/2015 | G06Q 50/40 |
| KR | 20200049037 A | * | 5/2020 | G06Q 50/12 |

OTHER PUBLICATIONS

Translation of CN_108594741_A (Year: 2018).*
Translation of KR 20200049037 A (Year: 2020).*
Translation of KR-20150056716-A (Year: 2015).*

*Primary Examiner* — Renan Luque
(74) *Attorney, Agent, or Firm* — Hoffman Warnick LLC

(57) ABSTRACT

Aspects of the invention relate generally to lighting devices and, more particularly, to a method and system for changing a function of a lighting device. In one embodiment, the invention provides a system comprising: at least one lighting device; an audio source; a controller for synchronizing an audio signal from the audio source with a lighting signal delivered to the at least one lighting device; and a transmitter for transmitting the audio signal from the audio source to at least one external receiver.

14 Claims, 6 Drawing Sheets

(56) References Cited

U.S. PATENT DOCUMENTS

2016/0037615 A1* 2/2016 Davis .................... H05B 47/19
315/291
2016/0212831 A1* 7/2016 Dobai ...................... G07C 9/20
2017/0006686 A1 1/2017 Vamberszky
2018/0087766 A1 3/2018 Zhang et al.
2018/0310387 A1 10/2018 Turvy, Jr. et al.
2019/0086046 A1 3/2019 Ganick et al.
2019/0177993 A1* 6/2019 Shell ......................... E04H 1/12
2019/0309939 A1 10/2019 Hand et al.
2019/0313517 A1 10/2019 Subramaniam et al.
2020/0094734 A1 3/2020 King
2020/0107422 A1 4/2020 Mcreynolds
2020/0288558 A1* 9/2020 Anderson .............. H05B 45/10
2020/0397936 A1* 12/2020 Deros ....................... A61L 2/24
2021/0084733 A1* 3/2021 Hamm ............... H05B 47/1965
2021/0360755 A1 11/2021 Upton et al.
2023/0092759 A1* 3/2023 Worm .................... G08C 17/00
315/129

* cited by examiner

FIG. 2

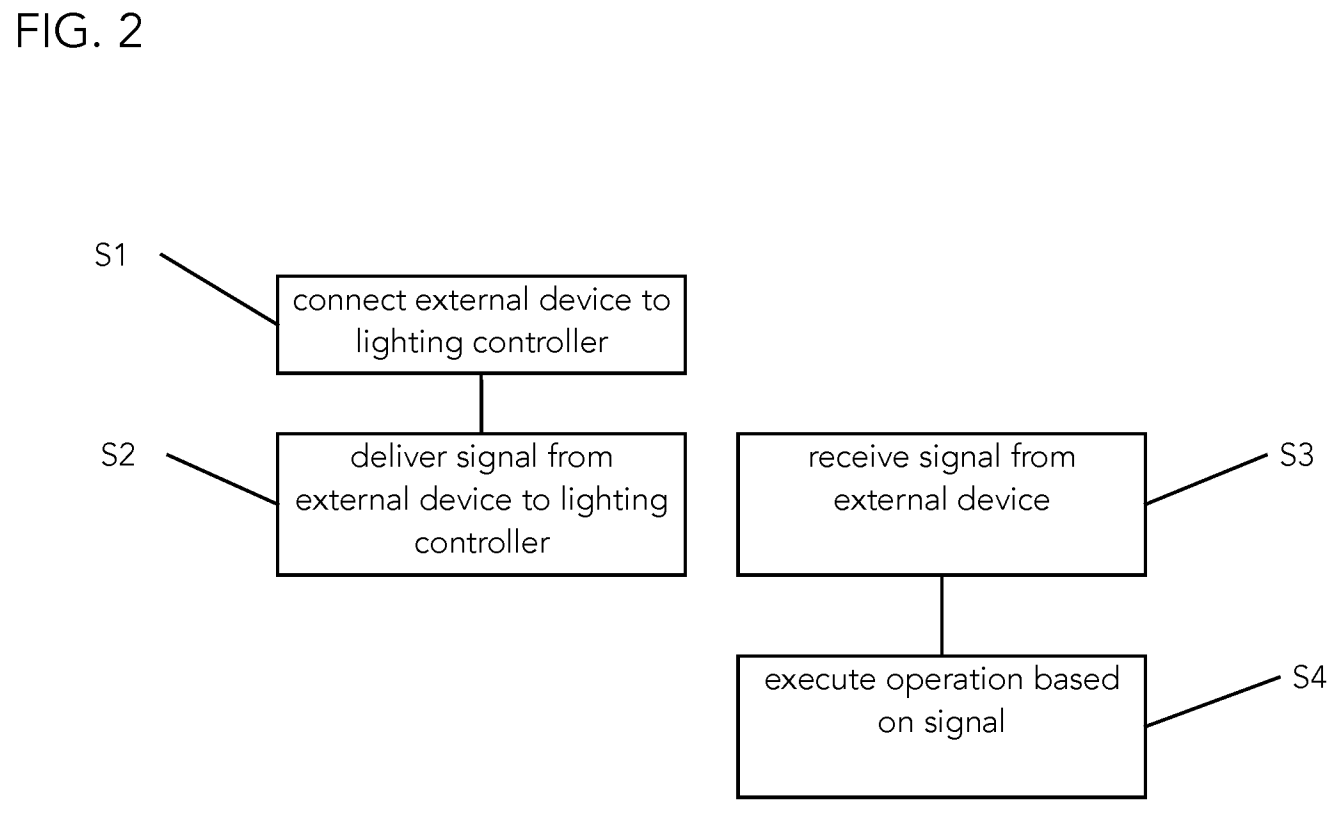

S1 connect external device to lighting controller

S2 deliver signal from external device to lighting controller

S3 receive signal from external device

S4 execute operation based on signal

FIG. 4

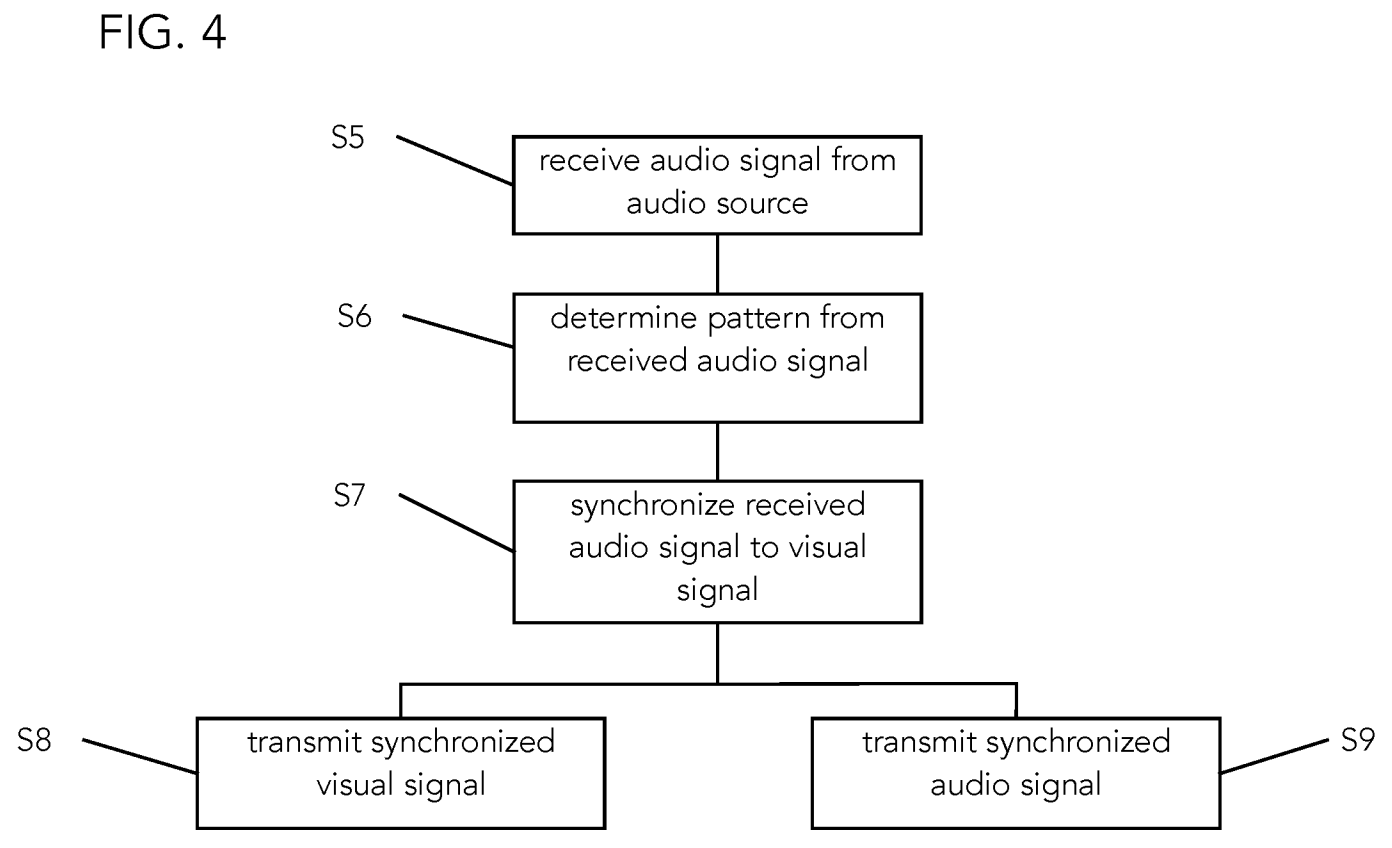

S5 receive audio signal from audio source

S6 determine pattern from received audio signal

S7 synchronize received audio signal to visual signal

S8 transmit synchronized visual signal

S9 transmit synchronized audio signal

METHOD AND SYSTEM FOR CHANGING A FUNCTION OF A LIGHTING DEVICE

CROSS-REFERENCE TO RELATED APPLICATIONS

This application is a continuation-in-part of co-pending U.S. patent application Ser. No. 18/047,508, filed 18 Oct. 2022, which is a continuation-in-part of co-pending U.S. patent application Ser. No. 17/450,337, filed 8 Oct. 2021, which claims priority to then-co-pending U.S. Provisional Patent Application Ser. No. 63/091,042, filed 13 Oct. 2020, each of which is hereby incorporated herein as though fully set forth.

BACKGROUND

There are any number of situations in which it may be necessary or desirable to wirelessly control a lighting device, including augmenting a light display being carried out using the lighting device. In some cases, it may be desirable or necessary to grant such control to individuals without physical access to a lighting controller connected to the lighting device.

SUMMARY

Aspects of the invention relate generally to lighting devices and, more particularly, to a method and system for changing a function of a lighting device.

In one embodiment, the invention provides a system comprising: at least one lighting device; a lighting controller connected to the at least one lighting device, the lighting controller being operable to control a function of the at least one lighting device; and an input controller connected to the lighting controller, the input controller including at least one receiving unit for receiving an input from an external device, wherein the input received from the external device changes the function of the at least one lighting device.

In another embodiment, the invention provides a method of changing a function of a lighting device, the method comprising: wirelessly connecting an external device to an input controller of a lighting control system connected to and operable to control a function of at least one lighting device; and using the external device, delivering a signal to the input controller, wherein the signal is capable of being operated on by the lighting control system to change the function of the at least one lighting device.

In still another embodiment, the invention provides a method of changing a function of a lighting device, the method comprising: wirelessly receiving, from an external device, an input signal; and executing, using a lighting controller connected to at least one lighting device, an operation based on the input signal to change a function of the at least one lighting device.

In still another embodiment, the invention provides a system comprising: at least one lighting device; and a lighting controller connected to the at least one lighting device, the lighting controller being operable to control a function of the at least one lighting device, wherein an input received from an external device changes the function of the at least one lighting device.

In yet another embodiment, the invention provides a method of changing a function of a lighting device, the method comprising: wirelessly connecting an external device to a lighting control system connected to and operable to control a function of at least one lighting device; and using the external device, delivering a signal to the lighting control system, wherein the signal is capable of being operated on by the lighting control system to change the function of the at least one lighting device.

In still yet another embodiment, the invention provides a method of changing a function of a lighting device, the method comprising: wirelessly receiving, from an external device, an input signal; and executing, using a lighting controller connected to at least one lighting device, an operation based on the input signal to change a function of the at least one lighting device.

In another embodiment, the invention provides a system comprising: at least one lighting device; an audio source; a controller for synchronizing an audio signal from the audio source with a lighting signal delivered to the at least one lighting device; and a transmitter for transmitting the audio signal from the audio source to at least one external receiver.

In another embodiment, the invention provides a system comprising: at least one lighting device; an audio receiver for receiving an audio signal from an external audio source; and a controller for synchronizing a received audio signal with a lighting signal delivered to the at least one lighting device.

In still another embodiment, the invention provides a method of synchronizing audio and visual signals, the method comprising: receiving, from an audio source, an audio signal; determining a rhythmic signal from the received audio signal; synchronizing the audio signal to a visual signal based on the determined rhythmic signal; and transmitting the synchronized visual signal.

And in yet another embodiment, the invention provides a lighting controller operable to: determine, from an access control system, whether a user has been granted access to an area containing a lighting device; receive an input from an external device; and control a function of the lighting device based on the input received from the external device.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 2 is a flow diagram of a method according to an embodiment of the invention;

FIG. 4 is a flow diagram of a method according to another embodiment of the invention;

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
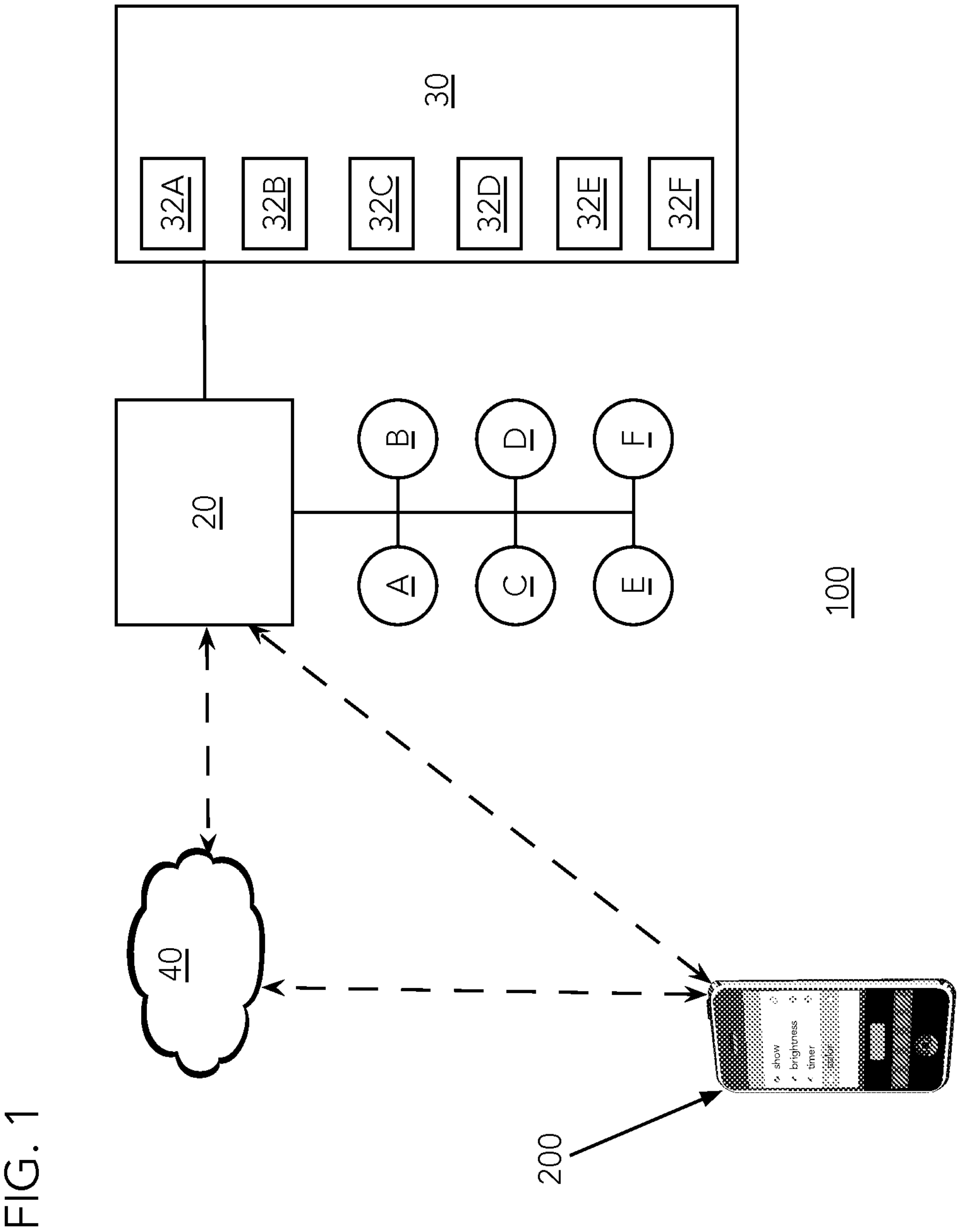
FIG. 1 is a schematic view of a system according to an embodiment of the invention.

FIG. 1 shows a schematic of a system 100 according to an embodiment of the invention. The system 100 includes a plurality of lighting devices A-F connected to a lighting controller 20. Lighting devices A-F may include any type of lighting device. In preferred embodiments, any or all of lighting devices A-F comprises or includes a light emitting diode (LED) lighting device. In particularly preferred embodiments, such LED lighting devices are capable of emitting light of varying colors. In FIG. 1, the system 100 is shown comprising a plurality of lighting devices A-F for the purposes of explaining various aspects of the invention. It should be appreciated, however, that systems according to the invention may include any number of lighting devices, including a single lighting device.

The lighting controller 20 may include hardware, software, or both, adapted to control one or more functions of lighting devices A-F, as will be understood by one skilled in the art. This may include, for example, a memory storing computer executable code for controlling a function of a lighting device, a processor for executing such code, an input/output (I/O) interface, and a communications interface.

As such, the lighting controller 20 may constitute or include a computing device, such as is known in the art, in which the processor executes code stored in the memory, reading and/or writing data from/to the memory and/or the I/O interface. The I/O interface enables a user to interact with the lighting controller 20 and/or for the lighting controller 20 to directly access an Internet or wireless network 40. The communications interface provides a communications link between each component of the lighting controller 20.

According to some embodiments, the system 100 further includes an input controller 30 connected to the lighting controller 20. This, however, is neither necessary nor essential. Any of the functionality described below with respect to the input controller 30 may be incorporated directly into the lighting controller 20.

The connection between the input controller 30 and the lighting controller 20 may constitute or include a wireless connection or may constitute or include a wired connection. In some embodiments of the invention, the input controller 30 is integrated into the lighting controller 20, although this is neither necessary nor essential.

The input controller 30 includes one or more receiving units 32A-F for receiving discrete inputs or signals related to the control of lighting devices A-F.

An external device, shown in FIG. 1 as a mobile phone 200, is capable of connecting to lighting controller 20 directly or via the Internet or a wireless network 40. For the sake of simplicity, only one external device is shown in FIG. 1, although it should be appreciated that lighting controller 20 may be capable of simultaneous connection to any number of external devices of any kind, including any number of mobile phones.

According to some embodiments of the invention, external devices may connect directly to the input controller 30 and/or its receiving unit(s) 32. According to other embodiments, external devices may connect to the input controller 30 and/or its receiving unit(s) 32A-F via the Internet or wireless network 40. Such methods of connection are well understood in the art and not described in further detail here.

Regardless of the method by which an external device connects to system 100, the external device (e.g., mobile phone 200 in FIG. 1) may be employed by a user to change one or more aspect of the operation of one or more of the lighting devices A-F.

For example, the lighting controller 20 may execute stored computer code in order to conduct a light display, a lighting show, or some other use of lighting devices A-F, wherein each lighting device emits a lighting signal in a sequence (e.g., first lighting device A, then lighting device B, then lighting device C, etc.) or of a particular color (e.g., lighting device A emits a red color, lighting device B emits a blue color, etc.). The mobile phone 200 may be employed, by its connection to the lighting controller 20, to alter or augment some aspect of the lighting display or show. For example, by sending a signal from the mobile phone 200 to the lighting controller 20, the sequence in which the lighting devices A-F are illuminated may be changed or the color emitted by each lighting device A-F may be changed.

As should be understood from the above, any aspect of any of the lighting devices A-F that would be subject to control using the lighting controller 20 may similarly be controlled by a user using an external device connected to the input controller 30 and/or one or more of its receiving unit(s) 32A-F. Lighting intensities, timings, or even whether a particular lighting device is activated are other aspects so controllable.

As noted above, the external device may connect to the lighting controller 20 using, for example, a web browser. Access to the lighting controller 20 may be via a hyperlink The link, in turn, may be provided to a user of the external device using, for example, a scannable image, such as a QR code. Other devices for providing such a link are known and will be apparent to one skilled in the art.

According to other embodiments of the invention, the link may be delivered to the external device via a message, such as an e-mail or text message.

It should be noted that nothing in the above should be construed as precluding the use of wired devices to access and control system 100, including lighting controller 20 and/or input controller 30, in addition to the use of external devices.

FIG. 2 shows a flow diagram of a method according to an embodiment of the invention. At S1, a user connects an external device 200 to the lighting controller 20. At S2, the external device is used to deliver a signal to the lighting controller 20. As should be clear from the above, S1 and S2 occur at the user's side of the method.

At S3, the signal sent from the external device is received at the lighting controller 20. At S4, the system 100 executes an operation based on the signal received at S3, as described above. As should be clear from the above, S3 and S4 occur at the system side of the method.

Figure 3:
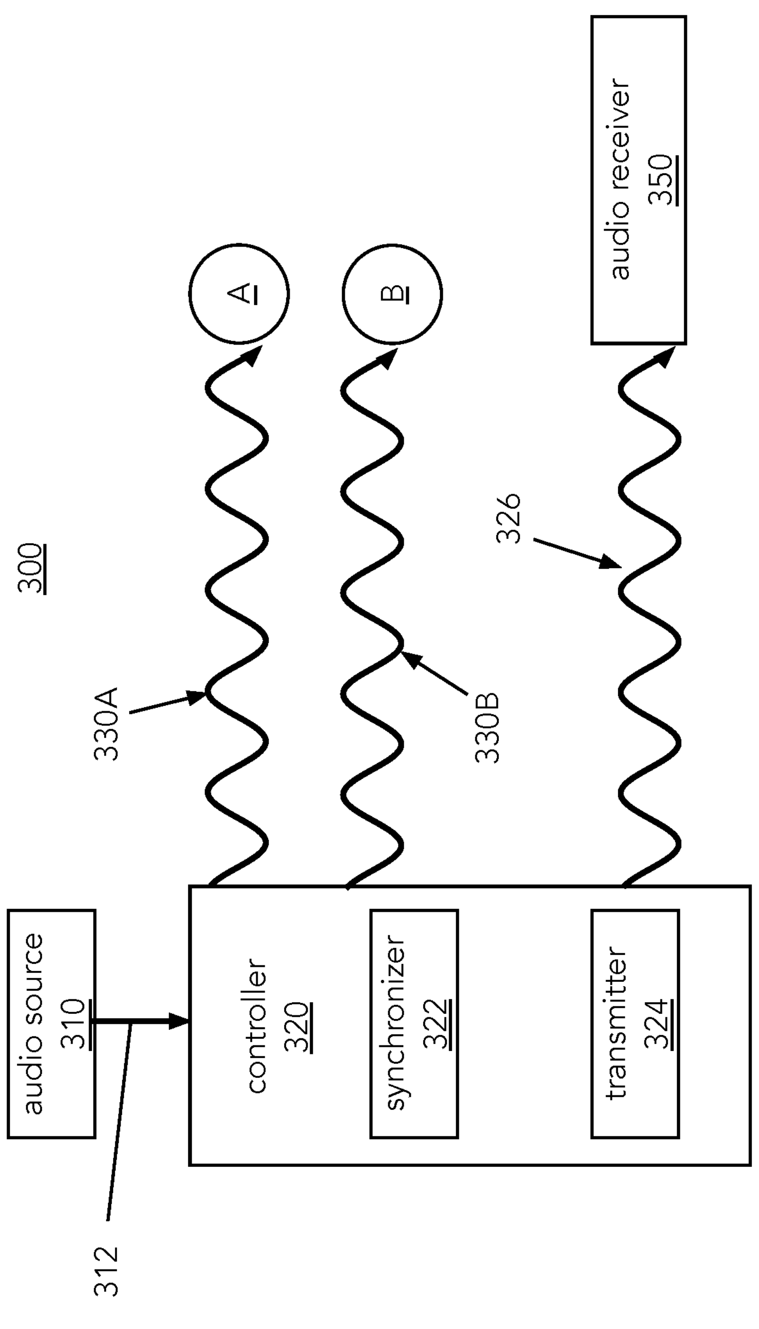
FIG. 3 is a schematic view of a system according to another embodiment of the invention.

FIG. 3 shows a schematic view of a system 300 according to another embodiment of the invention. Here, lighting devices A, B may be similarly controlled, but such control to include synchronization to an audio signal 312 from an audio source 310. As will be appreciated by one skilled in the art, the audio source 310 may include or comprise any device capable of delivering an audio signal or a signal that may be used to produce sound. Examples include, but are not limited to, a microphone, an audio tape player, a compact disc player, a streaming audio device, a mobile phone, and an audio system of a vehicle. In many cases, the audio signal 312 will include music, though this is neither necessary nor essential to the invention.

The audio signal 312 is transmitted from the audio source 310 to a controller 320. Such transmission may be via a wired or wireless connection. In the case that transmission of the audio signal 312 is via a wireless connection, the controller 320 may include a receiver or similar device (not shown) for receiving the audio signal 312 wirelessly. The controller 320 includes a synchronizer 322 operable to determine a pattern (e.g., a rhythmic pattern) from the audio signal, methods for which are well known in the art and not described in further detail here.

The synchronizer 322 is further operable to use the determined pattern to synchronize lighting signals 330A, 330B and a synchronized audio signal 326, which are then transmitted in such synchronized form by a transmitter 324. The lighting signals 330A, 330B are transmitted to lighting devices A and B, respectively, while the synchronized audio signal 326 is transmitted to an audio receiver. In FIG. 3, only two audio devices A, B are shown, merely for the sake of simplicity. Any number of lighting devices may be employed according to the invention. The transmitter 324 may transmit the lighting signals 330A, 330B and the synchronized audio signal 326 via a wired or wireless connection.

The audio receiver 350 may include any device capable of receiving the synchronized audio signal 326 and using it to produce an audible product. Examples include, but are not limited to, an audio system of a vehicle, an audio system including one or more speakers, headphone devices, and mobile phones.

In some cases, the synchronized audio signal 326 transmitted from the controller 320 will be substantially the same as the audio signal 312 received from the audio source 310, albeit synchronized with the lighting signals 330A, 330B. In fact, the synchronized audio signal 326 may simply be "passed through" the controller 320 substantially unchanged, the audio signal 312 merely being used as a target from which the rhythmic pattern is determined and to which operation of the lighting devices A, B will be synchronized.

The synchronized audio signal 326 may, in other cases, be supplemented, reduced, parsed, or reformatted, as compared to the audio signal 312. The invention is equally applicable in any such case, as will be appreciated by one skilled in the art.

Thus, the system 300 of FIG. 3 is capable of synchronizing an audio signal 312 and the lighting devices A, B such that as the audio signal 312 changes, the illumination of the lighting devices A, B changes in a synchronized manner. Often, such synchronization will include temporal synchronization, although other aspects of the audio signal 312 may also be synchronized to the lighting devices A, B. The relative volume of the audio signal 312, for example, may be synchronized to the intensity or color of the lighting devices A, B. In fact, various lighting features may be employed in such synchronization, including light intensity, light color, and light pattern (i.e., pattern of illumination).

FIG. 4 shows a flow diagram of a synchronization method according to embodiments of the invention. Continued reference to the features of FIG. 3 will be made merely for purposes of explanation. At S5, an audio signal 312 is received from an audio source 310. As noted above, the audio source 310 may be a source connected to the controller 320 and provided as a part of the system 300 or may be a source that connects, wirelessly or wired, to the controller 320. That is, in some embodiments, the audio source 310 may include an external device provided by a user rather than as a part of the system 300.

Regardless, after receiving the audio signal at S5, a pattern is determined from the received audio signal 312 at S6. As noted above, this may often be a rhythmic pattern, although other patterns may be determined from the received audio signal 312.

At S7, the received audio signal 312 and a visual are synchronized according to the pattern determined at S6. The visual signal may be, for example, the lighting signal 330A, 330B described above, which is operable upon one or more lighting devices A, B.

In the case that the determined pattern is a rhythmic pattern, the received audio signal 312 and the visual signal are temporally synchronized (e.g., the rhythmic pattern is used to synchronize the received audio signal 312 and a lighting signal 330A, 330B such that rhythmic accents of the received audio signal 312 are synchronized to corresponding accents in the lighting signal 330A, 330B).

At S8, the synchronized visual signal (e.g., lighting signal 330A, 330B) is transmitted to a device upon which it is operable (e.g., one or more lighting devices A, B) Similarly, at S9, which may occur simultaneously to S8, the synchronized audio signal 326 is transmitted to a device upon which it is operable, such as the audio receiver 350 (e.g., a speaker, a mobile telephone, an audio system of a vehicle). As noted above, in some embodiments, the synchronized audio signal 326 may simply constitute the received audio signal 312 "passed through" the system 300. In other embodiments, the synchronized audio signal 326 may be altered in some manner as compared to the received audio signal 312.

Figure 5:
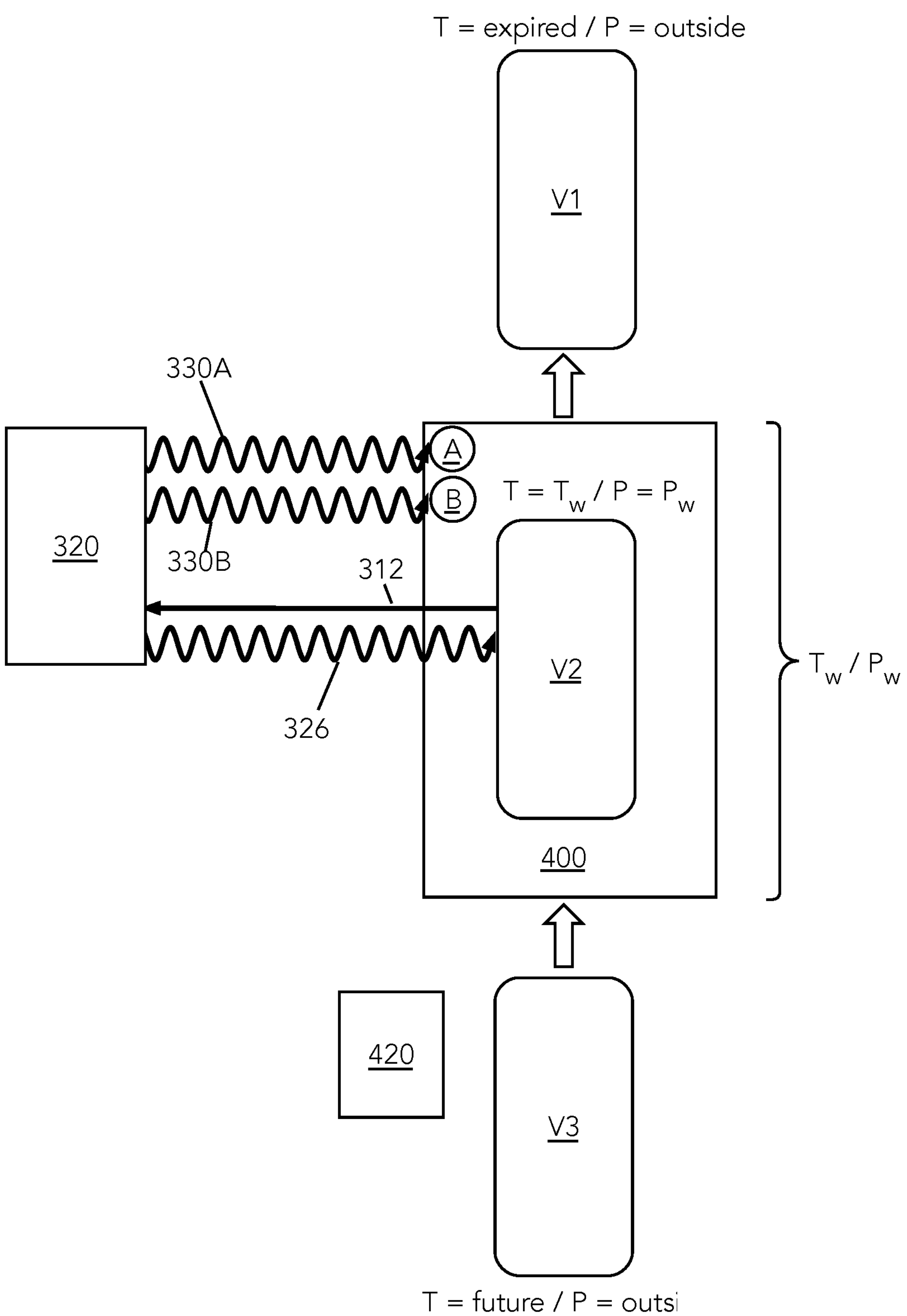
FIG. 5 is a schematic view of an application of a system and method according to a particular embodiment of the invention.

FIG. 5 is a schematic view of an embodiment of the invention as it may be implemented in the context of a carwash. Here, three vehicles V1, V2, and V3 are positioned at various locations with respect to a carwash bay 400. V1 has just exited the carwash bay 400, V2 is located within the carwash bay 400, and V3 has yet to enter the carwash bay 400.

Embodiments of the invention allow for a limited or restricted ability of a vehicle operator or passenger to control the lighting devices A, B and/or synchronize the lighting devices A, B to an audio signal 312, as described above. Although FIG. 5 shows only two lighting devices A, B for the sake of simplicity, one skilled in the art will recognize that the invention is applicable to any number of lighting devices.

Similarly, although the lighting devices A, B are shown within the carwash bay 400, as this is the more likely and desirable location for lighting devices to be controlled according to the invention, this is neither necessary nor essential. The invention is equally applicable to the control of lighting devices outside the carwash bay 400 or in another location entirely.

Upon approaching the carwash bay 400, the operator of V3 interacts with an automated kiosk 420 or similar device, as is known in the art, at which the operator may purchase a carwash. The ability of an operator of or passenger in a vehicle to control the lighting devices A, B and/or synchronize those lighting devices A, B to an audio signal 312 may be controlled in a number of ways.

For example, the kiosk 420 may include a QR code or similar device which the operator or passenger may use to visit a website for generating a digital token or similar device that is linked to the carwash just purchased. During the duration of the carwash just purchased, the operator or passenger may be granted access to the controller 320 for controlling the lighting devices A, B and/or synchronizing the lighting devices A, B to an audio signal 312, including an audio signal provided by the operator or passenger using a mobile telephone, the vehicle's audio system, etc. Upon completion of the carwash just purchased, such access may be revoked.

Alternatively, the kiosk 420 may dispense a code, one-time password (OTP), or similar device which the operator or passenger may then use on a website or a mobile application that similarly grants access to the controller 320.

Again, access to the website or mobile application may be made available via a QR code or similar device.

Another method of granting access includes the use of a license plate reader to verify the vehicle within the carwash bay 400. An operator of or passenger in the vehicle may then enter the vehicle license plate in a website or mobile application (which, again, may be accessed using a QR code or similar device). Once verified using the license plate reader, the operator of or passenger in the vehicle may be granted access to the controller 320 via the website or mobile application. When the vehicle exits the carwash bay 400, access to the controller 320 would cease because the license plate of the vehicle would no longer be verifiable using the license plate reader.

In addition, a member of a carwash club or service may be issued a card, token, or similar device which may be tied to a particular vehicle or a particular member of the club or service. Upon using the card, token, or similar device at the kiosk 420, access to the controller 320 may be granted for the carwash purchased using the card, token, or similar device.

Regardless of which method above is employed, access to the controller 320 may be based on a time period for the wash $T_w$, which may vary depending on the type of carwash purchased, and/or on a position $P_w$ of a vehicle within the carwash bay 400.

For example, in FIG. 5, only the operators of or passengers within V2 have access to the controller 320 because the time period for the wash $T_w$ purchased by the operator or passenger of V2 has begun and not yet ended ($T=T_w$) and/or because V2 is located within the carwash bay 400 ($P=P_w$).

Once the carwash has started and/or V2 is within the carwash bay 400, the operator of or passenger in V2 may control lighting devices A, B and/or synchronize lighting devices A, B to an audio signal 312. Here, the audio signal 312 is provided by the operator of or passenger in V2 (e.g., using a mobile telephone, the audio system of V2, or a similar device), although this is neither necessary nor essential. As noted above, the audio signal 312 may be provided by an audio source 310 (FIG. 3) provided as part of the system 300 (FIG. 3).

Using the controller 320, the operator of or passenger in V2 may control lighting devices A, B and/or synchronize the lighting devices A, B to the audio signal 312. As described above, the controller 320 is operable to determine a pattern (e.g., a rhythmic pattern) from the audio signal 312 and use that determined pattern to send a synchronized lighting signal 330A, 330B to the lighting devices A, B. The controller 320 is also operable to transmit a synchronized audio signal 326 to an audio receiver 350 (FIG. 3). In FIG. 5, the synchronized audio signal 326 is transmitted back to a mobile telephone, the audio system of V2, etc., although this is neither necessary nor essential. The synchronized audio signal 326 could be transmitted to a different audio receiver 350, such as a speaker (not shown) located within the carwash bay 400, as will be understood by one skilled in the art.

Unlike V2, the access of the operator of or passenger in V1 has been revoked because the time period for the wash $T_w$ purchased by that operator or passenger has ended (T=expired) and/or because V1 is no longer within the carwash bay 400 (P=outside). Similarly, the operator of or passenger in V3 has not yet been granted access because the time period of the wash $T_w$ purchased by that operator or passenger has not yet begun (T=future) and/or because V3 is not yet within the carwash bay 400 (P=outside).

As will be apparent to one skilled in the art, the method and system disclosed above with respect to the particular embodiment of FIG. 5 is more broadly applicable to methods and systems for controlling lighting devices generally and for controlling lighting devices in conjunction or combination with external access control systems.

For example, embodiments of the invention are applicable to lighting controllers operable to control a function of a lighting device based on whether an access control system has granted access to an area containing the lighting device. Thus, a lighting controller (e.g., controller 320 of FIG. 5) may determine whether an access control system (e.g., kiosk 420 of FIG. 5) has granted access to a particular area containing the lighting device to be controlled by the lighting controller. Kiosk 420 is but one particular access control system and in no way limiting of the invention. Any access control system may be employed and lighting controllers according to various embodiments of the invention may be integrated into or added to existing access control systems to facilitate the control of lighting devices.

Figure 6:
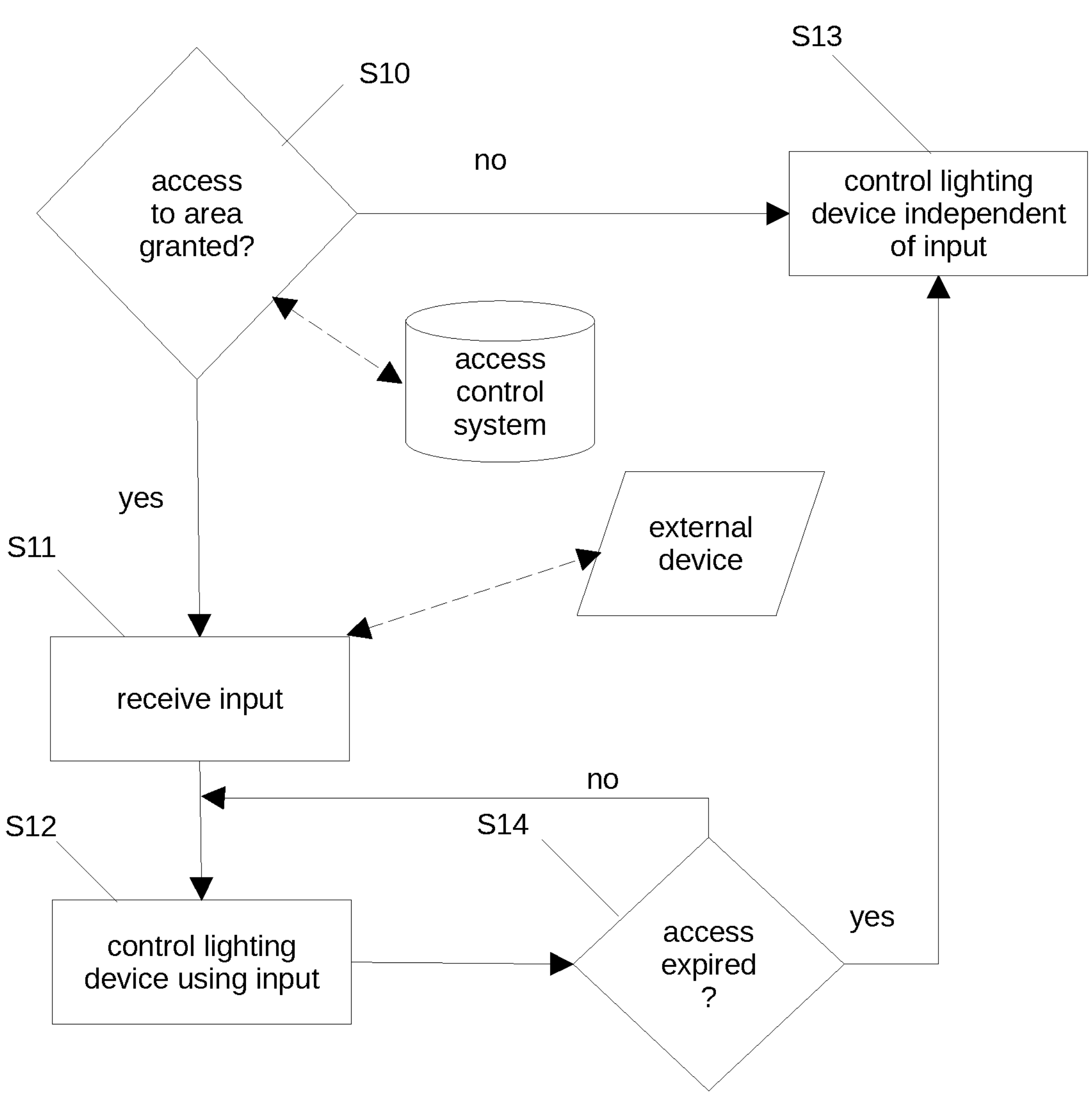
FIG. 6 is a flow diagram of a method according to still another embodiment of the invention.

FIG. 6 shows a flow diagram of a more broadly applicable method as may be carried out using a lighting controller according to embodiments of the invention. At S10, it is determined whether access has been granted to an area containing a lighting device to be controlled. If so (yes at S10), input from an external device is received by the controller at S11. At S12, the input received from the external device at S11 is used to control the lighting device.

If, on the other hand, access has not been granted to the area containing the lighting device (no at S10), the lighting device is controlled by the lighting controller independent of input from the external device.

Following a predetermined period of time, it is determined at S14 whether access to the area has expired. If so (yes at S14), flow passes to S13 where the lighting device is controlled by the lighting controller independent of input from the external device. If not (no at S14), flow returns to S12, with the lighting controller controlling the lighting device using the input from the external device.

One skilled in the art will recognize that variations on the method of FIG. 6 are possible and within the scope of the invention.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any related or incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A lighting controller operable to:

determine, from an access control system, whether a user has been granted access to a vehicle wash bay containing a lighting device based on purchase of a vehicle wash service to be performed on a vehicle in the vehicle wash bay;

receive an input from an external device; and control a function of the lighting device based on the input received from the external device, wherein control is enabled only while the vehicle wash service is being actively performed on the vehicle within the vehicle wash bay.

2. The lighting controller of claim 1, wherein the external device is controlled by the user and, in the case that it is determined that the user has been granted access to the vehicle wash bay containing the lighting device, the input received from the external device is used to control the function of the lighting device.

3. The lighting controller of claim 2, wherein, in the case that it is determined that the user has not been granted access to the vehicle wash bay containing the lighting device, the lighting controller is further operable to control the function of the lighting device independent of the input received from the external device and the access control system is operable to revoke access to the vehicle wash bay.

4. The lighting controller of claim 1, wherein determining whether the user has been granted access to the vehicle wash bay containing the lighting device includes receiving a signal from the access control system that the user has been granted access to the vehicle wash bay containing the lighting device by the access control system.

5. The lighting controller of claim 4, wherein the access granted by the access control system is limited to a duration of the vehicle wash service.

6. The lighting controller of claim 4, wherein the access granted by the access control system is limited to a predetermined time period.

7. The lighting controller of claim 6, further operable to:

control the function of the lighting device independent of the input received from the external device upon expiration of the predetermined time period.

8. The lighting controller of claim 1, wherein the external device is a cellular telephone.

9. A lighting device control system comprising:

the lighting controller of claim 1;

at least one lighting device connected to the lighting controller; and an access control system operable to grant to and revoke from a user access to a vehicle wash bay containing a lighting device.

10. A method of controlling lighting in a vehicle wash bay, the method comprising:

determining whether a user has been granted access to the vehicle wash bay;

determining whether a vehicle wash service is being actively performed on a vehicle in the vehicle wash bay;

receiving an input from an external device; and controlling a function of at least one lighting device within the vehicle wash bay using the input from the external device only while it is determined that the user has been granted access to the vehicle wash bay and that the vehicle wash service is being actively performed on the vehicle within the vehicle wash bay.

11. The method of claim 10, wherein determining whether the user has been granted access to the vehicle wash bay includes determining whether the user has purchased the vehicle wash service to be performed on the vehicle in the vehicle wash bay.

12. The method of claim 11, wherein access to the vehicle wash bay is granted only for a time required to provide the vehicle wash service.

13. The method of claim 12, further comprising:

determining whether the time required to provide the vehicle wash service has expired.

14. The method of claim 13, further comprising:

ceasing control of the function of the at least one lighting device if it is determined that the time required to provide the vehicle wash service has expired.

* * * * *